United States Patent [19]

Early et al.

[11] Patent Number: 4,572,532
[45] Date of Patent: Feb. 25, 1986

[54] MUD FLAP HOLDER FOR TRUCKS

[76] Inventors: William C. Early; Betty J. Early, both of 236 S. 184 E. Ave., Tulsa, Okla. 74108

[21] Appl. No.: 633,966

[22] Filed: Jul. 24, 1984

[51] Int. Cl.[4] ............................................. B62D 25/18
[52] U.S. Cl. ............................ 280/154.5 R; 24/67.11; 24/500; 24/567
[58] Field of Search ................... 280/152 R, 154.5 R, 280/154, 154.5 A; 248/316.5, 231.5; 24/67.5, 67.7, 499, 500, 505, 509, 510, 566, 567, 67.11

[56] References Cited

U.S. PATENT DOCUMENTS

| | | | |
|---|---|---|---|
| 1,754,147 | 4/1930 | Cookson | 280/154.5 R |
| 3,059,945 | 10/1962 | Robb | 280/154.5 R |
| 3,091,478 | 5/1963 | Ambli | 280/154.5 R |
| 3,244,432 | 5/1966 | Ambli | 280/154.5 R |
| 3,700,260 | 10/1972 | Moore | 280/154.5 R |

Primary Examiner—David M. Mitchell
Assistant Examiner—Richard M. Camby
Attorney, Agent, or Firm—Head, Johnson & Stevenson

[57] ABSTRACT

A mud flap holder assembly adapted to be secured to a vehicle in the proximity of the rear of a tire or wheel which is to be serviced by the mud flap, the assembly comprising a first bar adapted to be secured to the vehicle, and a second bar secured to the first bar by clamp members whereby the second bar may be clamped against the first bar for clamping the mud flap therebetween and readily released from the clamped position for removal or replacement of the mud flap from the assembly, arm members extend outwardly from one of the bar members for limiting the movement of the clamped mud flap in a direction away from the outer periphery of the tire or wheel thus assuring an efficient operation of the mud flap as the vehicle moves over a roadway, or the like.

3 Claims, 6 Drawing Figures

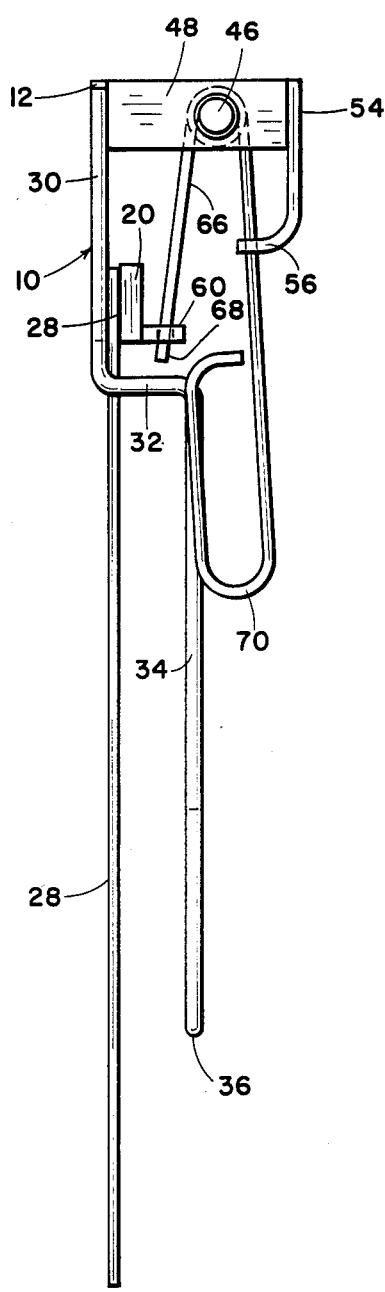
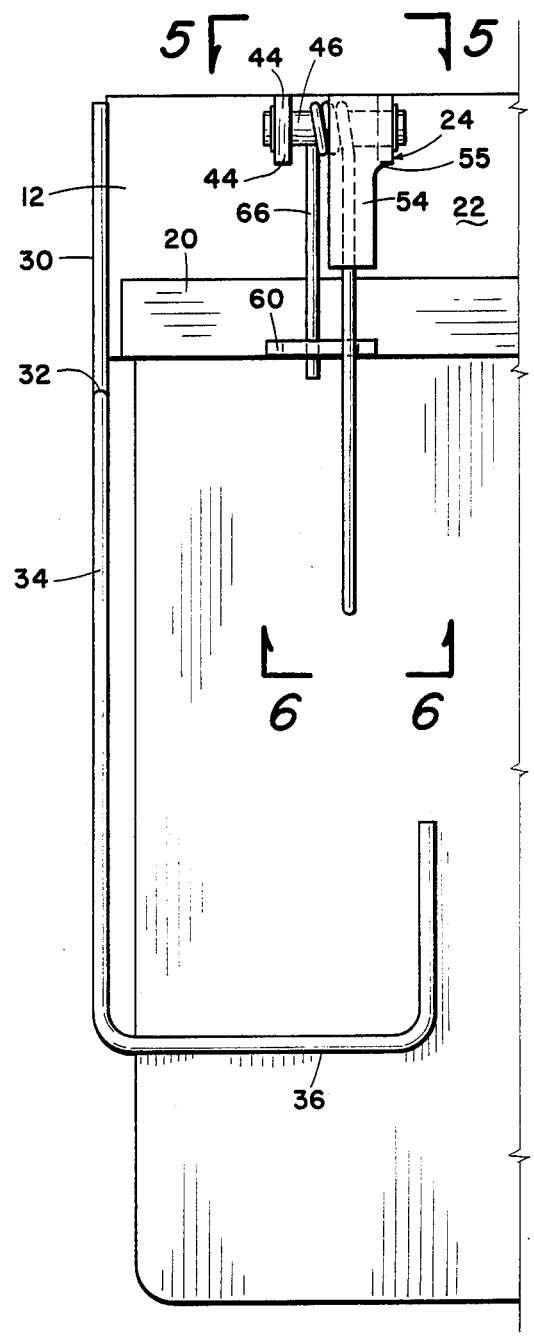
Fig. 1
Fig. 2

MUD FLAP HOLDER FOR TRUCKS

BACKGROUND OF THE INVENTION

1. Field of the Invention

This invention relates to improvements in mud flap holders and more particularly, but not by way of limitation to a mud flap holder for large vehicles, such as trucks.

2. Description of the Invention

Many vehicles, and particularly large vehicles such as trucks, are required to install mud flaps in the proximity of at least the rear tires or wheels of the vehicle in order to reduce the splattering of mud, water and other debris against other traffic during travel of the vehicle over a roadway, highway, or the like. The present day mud flaps in widespread use normally include a rubber or other yieldable substantially flat plate member having the upper edge thereof secured to the vehicle substantially immediately behind the rear tires or wheels of the vehicle for intercepting any debris being thrown upwardly by the wheels as they move over the surface of the roadway. One particular disadvantage of these present day mud flaps is that the forward motion of the vehicle is usually at such a great speed that the loose lower end of the mud flap is blown in a direction away from the tire or wheel, and the mud flap is thus removed from the direct or proximate position with respect to the wheel or tire, and no longer efficiently intercepts the debris being thrown or cast by the movement of the tire. As a result, a dirty mist is frequently sprayed around the area rearwardly disposed of the vehicle, and this mist is usually sprayed onto other vehicles in the traffic pattern, causing the windows of the other vehicles to become covered with the mist in such a manner as to hinder the vision of the vehicle driver.

Examples of the presently available mud flaps and/or mud flap holders are shown in the Cookson U.S. Pat. No. 1,754,147, Eberwine U.S. Pat. No.3,057,643, Robb U.S. Pat. No. 3,059,945, Ambli U.S. Pat. No. 3,091,478, Ambli U.S. Pat. No. 3,244,432, Salden Pat. No. 4,103,918, Appelblatt U.S. Pat. No. 4,174,653, and the Sogoian U.S. Pat. No. 4,180,230. The Appelblatt Pat. No. 4,174,643 is related to displaceable wheel well fairing panels for an armored wheeled vehicle, but does not offer a solution to the problem now existing in connection with the over-the-road vehicles, such as large trucks, and the like.

SUMMARY OF THE INVENTION

The present invention contemplates a novel mud flap holder which has been particularly designed and constructed for overcoming the foregoing disadvantages. The novel mud flap holder comprises an elongated bar adapted to be secured to the vehicle or truck frame substantially immediately above and behind the wheels of the vehicle to be protected by the apparatus. For example, any pair of trailing or rearwardly disposed set of dual wheels or tires may be protected by a mud flap anchored or carried by the novel holder, as well as any single mount wheels or tires. However, the embodiment shown herein is particularly constructed for use with the usual dual wheel environment such as found on an eighteen-wheel vehicle, or the like. A second elongated bar overlays the outer surface of the first bar, and is movable in directions away from and toward the first bar for receiving and clamping the upper edge of a mud flap therebetween. Clamping means is operably connected between the two bars for facilitating the separation thereof for insertion of the mud flap therebetween, and for securely clamping the bars together for holding the mud flap against accidental loss from connection with the bars. A pair of oppositely disposed spaced arm members extend outwardly from the first bar member and each arm member is provided with a substantially U-shaped element at the outer ends thereof. The arms are disposed in a plane which is offset with respect to the plane of the first bar member, and the U-shaped elements at the outer ends thereof extend in directions toward each other. The mud flap which is secured between the two bars is disposed in the plane between the plane of the first bar and the plane of the arm members whereby the arm members securely hold the mud flap against movement in a direction away from the tires or vehicle wheels being protected thereby. If desired, the outer ends of the U-shaped elements may be placed against the inwardly directed face of the mud flap whereby the flap is held against movement in directions both toward and away from the wheels. In this manner, the mud flap is maintained in a position for an efficient deflection of the debris created by the movement of the tires over the roadway, and against engagement with the tires for precluding wearing of the flap by the friction created when the mud flap is in engagement with a rotating tire. The novel mud flap holder is simple and efficient in operation and economical and durable in construction.

BRIEF DESCRIPTION OF THE DRAWINGS

FIG. 1 is a side elevational view of a mud flap holder embodying the invention and illustrates a mud flap secured thereto.

FIG. 2 is a front elevational view of a portion of a mud flap holder embodying the invention, with a portion of a mud flap shown secured thereto.

DETAILED DESCRIPTION OF THE PREFERRED EMBODIMENT

Figure 4:
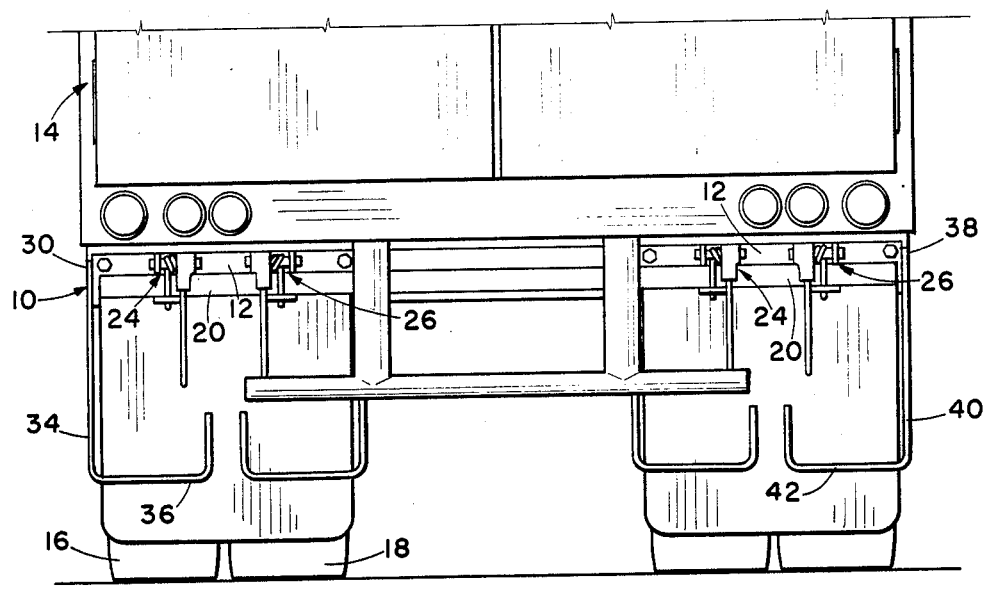
FIG. 4 is a rear elevational view of a portion of a vehicle having mud flaps secured thereby by mud flap holders embodying the invention.

Referring to the drawings in detail, reference character 10 generally indicates a mud flap holder comprising a first elongated plate or bar 12 adapted to be bolted or otherwise secured to the frame (not shown) of a vehicle, such as a truck 14, in the proximity of at least one wheel or tire 16 of the truck. As shown in FIG. 4, the mud flap holder is installed in the proximity of the railing end of a dual wheel assembly 16–18, but there is no intention of limiting the invention to use in a dual wheel environment. A second elongated plate or bar 20 is movably disposed against one face 22 of the first bar 12 and is retained in a normal position of enngagement with the face 22 by suitable spring urged clamping means 24 and 26. A suitable mud flap 28 of any well known construction may be secured or clamped between the plates or bars 12 and 20 by inserting one edge 28 thereof against the face 22 and clamping the bar 20 thereagainst in a manner as will be hereinafter set forth.

A first arm member 30 may be welded or otherwise secured to one end of the bar or plate 12 and is provided with a dog-leg or angled portion 32 connecting an outer rod member 34 therewith in such a manner that the plane in which the rod member 34 lies is offset with respect to the plane of the face 22. The outer end of the rod member 34 is preferably provided with a substantially U-shaped element 36 which preferably lies in a common plane with the rod member 34 and extending in a direction toward the center of the bar 12, as particularly shown in FIGS. 2 and 4. A second arm member 38 substantially identical with the arm 30 may be welded or otherwise secured to the opposite end of the bar 12 and is provided with an offset rod member 40 similar to the rod member 34, and a U-shaped element 42 at the outer end thereof similar to the element 36. The U-shaped element 42 preferably lies in a common plane with the rod member 40 and extending therefrom in a direction toward the U-shaped element 36. The mud flap 28 is thus confined within the limit determined by the position of the rods 34 and 40 and the U-shaped elements 36 and 40, thus precluding any substantial movement of the flap 28 in a direction away from the tire or tires 16-18. It may be preferable to arrange the mud flap in such a manner that at least one of the U-shaped elements 36 or 42 is disposed against the reverse side of the flap with respect to the rod members 34 and 40, thus confining the mud flap 28 against movement in directions either away from or toward the tire or tires 16-18.

The clamping means 24 and 26 are substantially identical, but oppositely disposed, and accordingly only one will be set forth in detail herein. As particularly shown in FIGS. 5 and 6, the clamping means 24 comprises a flange member 44 welded or otherwise secured to the face 22 of the bar 12, and having an aperture (not shown) provided therein for receiving one end of a shaft 46 therethrough. A second flange member 48 may be welded or otherwise rigidly secured to the face 22 in spaced relation with respect to the flange 44, and is provided with an aperture (not shown) for receiving the opposite end of the shaft 46 therethrough. Of course suitable lock washers 50 and 52, or the like, may be provided in the proximity of the opposite ends of the shaft 46 and in the proximity of the flanges 44 and 48, respectively, for retaining the shaft in position, as is well known. The outer end of the flange 48 is provided with a plate means 54 disposed in a plane substantially perpendicular to the plane of the flange 48 and extending in a direction toward the flange 44. The outer end 56 of the plate 54 is preferably disposed at an angle with respect to the plane of the plate 54, and may be provided with a recess or notch 58 along the outer edge thereof.

Figure 3:
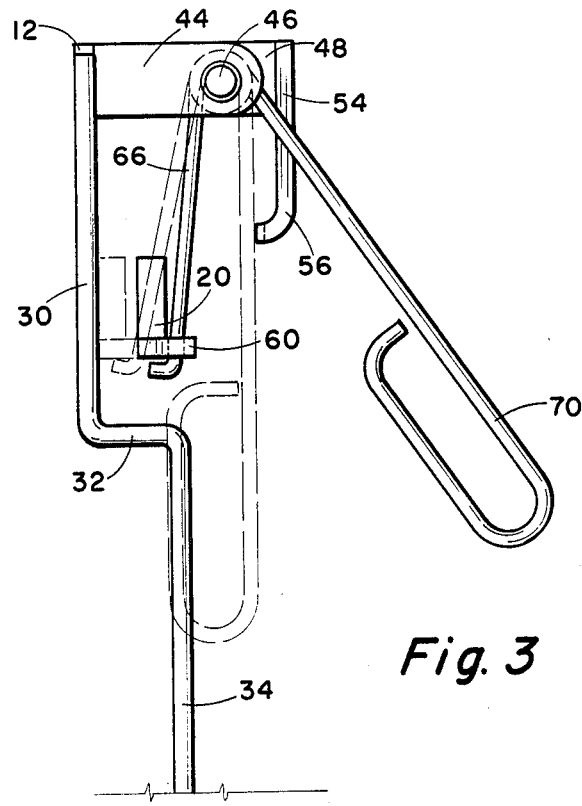
FIG. 3 is a side elevational view of a clamping member which may be utilized in a mud flap holder embodying the invention, with the open position thereof shown in solid lines and the clamping position thereof shown in broken lines.
Figure 5:
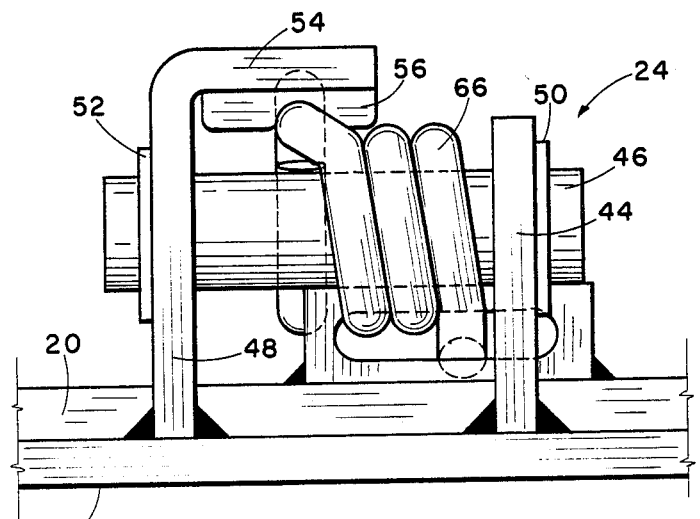
FIG. 5 is a view taken on line 5—5 of FIG. 2.
Figure 6:
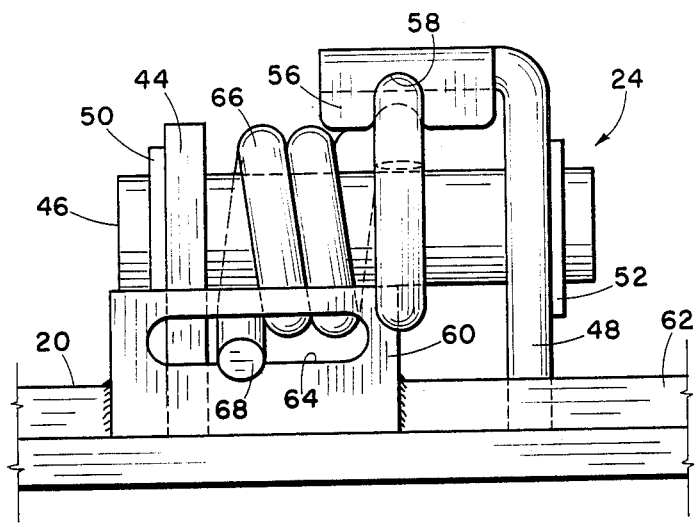
FIG. 6 is a view taken on line 6—6 of FIG. 2 with the mud flap eliminated for purposes of illustration.

A flange member 60 may be welded or otherwise rigidly secured to one elongated edge 62 of the bar 20 and is provided with an elongated slot 64 in substantial alignment with at least a portion of the central portion of the shaft 46, as particularly shown in FIGS. 5 and 6. A helical spring means 66 is wound or disposed around the outer periphery of the shaft 46 between the flanges 44 and 48, and has one end 68 disposed in or anchored to the slot 64. The opposite end of the spring means 66 extends tangentially outwardly from the outer periphery of the shaft 46 and into removable engagement with the recess 58 and terminating in a loop or hand-hold member 70 (FIGS. 1 and 3). As long as the spring means 66 is in engagement with the recess 58, the force of the spring urges the plate member 20 into a tight engagement with the face 22, and if the edge 28 of the mud flap 26 is disposed between the face 22 and the bar 20, the bar 20 will securely retain the mud flap in position.

In order to release the engagement of the bar 20 with the face 22 of the bar 12, or from engagement with the edge 28 of the mud flap 26, the hand-hold 70 may be manually grasped whereby the spring means 66 may be removed from engagement with the detent or recess 58, whereupon the spring means 66 is freed from its taut position around the shaft 46 to permit movement of the bar 20 in a direction away from the bar 12. The spring 66 is limited in the released action by engagement with the edge of the plate 54 at the juncture 55 (FIG. 2) thereof with the flange 48. This provides for a sufficient movement of the spring means 66 for movement of the plate 20 away from the bar 12 and precludes a complete loss or release of the spring means 66 during the action. When the bar 20 is disengaged from the bar 12, the mud flap 26 may be removed from the holder assembly 10, and replaced with a new flap, if necessary. In order to clamp the new flap 26 in position, the hand-hold 70 may be manually grasped for positioning the spring means 66 in engagement with the recess 58, whereupon the spring means 66 functions for securely retaining the bar 20 against the mud flap 26, thus securely retaining the flap against accidental loss from the holder 10. The arm or rod members 34 and 40 preclude any substantial movement of the mud flap in a direction away from the outer periphery of the tire 16-18, thus assuring an efficient operation of the mud flap and prolonging the useful life thereof.

From the foregoing it will be apparent that the present invention provides a novel mud flap holder having a first bar means adapted to be secured to the truck frame in the proximity of the tire or wheel with which the mud flap is to be utilized. A second bar is movably secured to the first bar and is secured thereby by clamping means whereby the bars are held in a clamping position therebetween for securely holding the mud flap in the holder. Arm members are provided for the assembly to restrict the movement of the mud flap in a direction away from the outer periphery of the tires or wheels during travel of the vehicle over a roadway, thus assuring that the mud flap will function efficiently during use thereof.

Whereas the present invention has been described in particular relation to the drawings attached hereto, it should be understood that other and further modifications, apart from those shown or suggested herein may be made within the spirit and scope of this invention.

What is claimed is:

1. A mud flap holder comprising first bar means adapted to be secured to a vehicle in the proximity of a tire to be serviced by the mud flap, second bar means movably secured to the first bar for movement in directions toward and away from the first bar for clamping the mud flap therebetween and releasing the mud flap from engagement with the holder, clamping means operably secured between the first and second bar means for providing said movement for the second bar means with respect to the first bar means wherein the clamping means comprises spring urged means secured between the first and second bar means for constantly urging the second bar means in a direction toward the first bar means in a first position of the spring means and freeing the second bar means for movement in a direction away from the first bar means in a second position of the spring means, a first stop means provided on the clamping means for retaining the spring means in the first position thereof, a second stop means provided on the clamping means for limiting the movement of the spring means in the second position thereof, and arm means secured to at least one of the bar means and extending outwardly therefrom for limiting the movement of the clamped mud flap in a direction away from the tire during movement of the vehicle.

2. A mud flap holder as set forth in claim 1 wherein the arm means is secured to the first bar means and is provided with an element disposed in a plane offset with respect to the plane of the first bar means, such as to preclude said arm means interference with the clamping of the mud flap between the first and second bar means while providing for the limiting of the movement of the clamped mud flap in the direction away from the tire during movement of the vehicle.

3. A mud flap holder as set forth in claim 2 wherein the arm means comprises a pair of substantially identical but oppositely disposed U-shaped elements in a plane offset with respect to the plane of the first bar means for engagement by the mud flap during travel of the vehicle to provide for the limiting of the movement of the clamp mud flap in the direction away from the tire.

* * * * *